(12) United States Patent
Idsinga et al.

(10) Patent No.: US 7,184,873 B1
(45) Date of Patent: Feb. 27, 2007

(54) VEHICLE SPEED LIMITING DEVICE

(75) Inventors: Robert M. Idsinga, Roxboro (CA); Alexandre J. G. R. Pepin, Cowansville (CA); Bryan Leonard Creagan, Saint-Lazare (CA)

(73) Assignee: Stanox Technologies Inc., Hudson (CA)

( * ) Notice: Subject to any disclaimer, the term of this patent is extended or adjusted under 35 U.S.C. 154(b) by 0 days.

(21) Appl. No.: 11/418,120

(22) Filed: May 5, 2006

(51) Int. Cl.
*B60T 8/32* (2006.01)

(52) U.S. Cl. .......................................... 701/93; 180/179

(58) Field of Classification Search ................ 701/93, 701/94, 95, 96, 110; 180/170–179
See application file for complete search history.

(56) References Cited

U.S. PATENT DOCUMENTS

| | | | |
|---|---|---|---|
| 3,878,915 A | | 4/1975 | Purtland et al. |
| 6,098,007 A | * | 8/2000 | Fritz ............................ 701/93 |
| 6,188,949 B1 | | 2/2001 | Hahn et al. |
| 6,198,996 B1 | | 3/2001 | Berstis |
| 6,273,204 B1 | * | 8/2001 | Winner et al. .............. 180/170 |
| 6,285,945 B1 | * | 9/2001 | Sielagoski et al. ............ 701/96 |
| 6,393,352 B2 | * | 5/2002 | Sielagoski et al. ............ 701/96 |
| 6,604,043 B2 | * | 8/2003 | Sielagoski et al. ............ 701/96 |
| 2002/0170762 A1 | | 11/2002 | Daneshmand |

FOREIGN PATENT DOCUMENTS

| | | |
|---|---|---|
| EP | 0 843 177 | 5/1998 |
| WO | WO 84/03785 | 9/1984 |
| WO | WO 2004/007930 | 1/2004 |

\* cited by examiner

*Primary Examiner*—Richard M. Camby
(74) *Attorney, Agent, or Firm*—Ogilvy Renault, LLP

(57) ABSTRACT

The invention relates to a device for preventing selected users from driving a vehicle above a particular speed. The speed limit value can be programmed by the selected users by driving the vehicle at a desired speed limit and providing programming instruction. The device provides, from acceleration control signals received from the acceleration pedal, altered acceleration control signals. When in non speed limiting mode, the device simply forwards the acceleration control signals to the engine control unit or the electronic throttle controller. When in speed limiting mode, the device makes no change to the acceleration control signals if the vehicle speed is below the speed limit value and alters the acceleration control signals if the vehicle speed reaches the speed limit value, in order to limit the speed of the car.

23 Claims, 8 Drawing Sheets

VEHICLE SPEED LIMITING DEVICE

BACKGROUND OF THE INVENTION

1) Field of the Invention

The invention relates to devices for preventing the speed of a motor vehicle from exceeding a particular value. More particularly, the invention relates to devices for preventing selected users from driving a vehicle above a particular speed.

2) Description of the Prior Art

As shown in U.S. Pat. No. 6,188,949 to Hahn et al. and in U.S. Pat. No. 3,878,915 to Purland et al., a vehicle speed limiting device is a device that enables the owner or input user of a vehicle, such as a car, a truck, a bus or all-terrain vehicle, to set a maximum speed value that must not be exceeded. The device prevents selected users from driving a vehicle above a particular speed while allowing other users to drive the vehicle with no or less speed restriction. One possible use of this device is for parents to limit the speed at which their children can drive a vehicle. This device can alternatively be used by car/truck rental companies to control the speed at which their rental units are driven.

In U.S. Pat. No. 6,198,996 to Berstis, the control software of the onboard engine computer is modified to perform speed limitation. Installation of such a speed limiting devices requires reprogramming the onboard computer to install vehicle specific control software. On the car market right now, each car manufacturer and each car model have their own control software. Reprogramming the engine computer is thus model specific. Knowledge of and access to the specific control software is mandatory to create a new modified software with the speed limiting feature. These systems are appropriate to factory installation but may be less suitable for third-party installation or plug-in products.

Previously disclosed speed limiting systems allow the input user to program user specific speed limits. An appropriate user interface is thus needed to allow the user to enter the specific speed limit value. Typical user interfaces includes a display and a keyboard to program the speed limit value. Speed limit programming is restricted by means of password. Such a user interface may be bulky and may use considerable space in the vehicle's dashboard.

There is thus a need for a speed limiting system that overcomes at least some of the above-mentioned concerns.

BRIEF SUMMARY OF THE INVENTION

One aspect of the invention provides a speed limiting device which is adapted for post-factory installation.

The invention relates to a device for preventing selected users from driving a vehicle above a particular speed while allowing other users to drive the vehicle with no or less speed restriction. The speed limit value can be programmed by the selected users by driving the vehicle at a desired speed limit and providing programming instruction. The device provides, from acceleration control signals received from the acceleration pedal, an altered acceleration control signals. When in non speed limiting mode, the device simply forwards the acceleration control signals to the engine control unit or electronic throttle controller. When in speed limiting mode, the device makes no change to the acceleration control signals if the vehicle speed is below the speed limit value and alters the acceleration control signals if the vehicle speed reaches the speed limit value, in order to limit the speed of the car.

One aspect of the invention provides a speed limiting device for installation in a vehicle and for preventing a value of a speed of said vehicle from exceeding a speed limit value, said device comprising: an input for receiving a first and a second input acceleration control signals and a vehicle speed signal representative of said speed value, wherein a ratio between the first and second input acceleration control signals defines an input ratio; and a main unit, linked to said input, for generating, from said first and said second input acceleration control signals, a first and a second output acceleration control signals, at least one of said first and said second output acceleration control signals for controlling said speed, wherein a ratio between said first and said second output acceleration signals defines an output ratio that is substantially equal to said input ratio, said main unit being capable of adopting a speed limiting mode wherein said first and said second output acceleration control signals are such that said speed value is prevented from increasing beyond said speed limit value while said input and said output ratios remain substantially equal.

Another aspect of the invention provides a method for preventing a value of a speed of a vehicle from exceeding a speed limit value, said method comprising: receiving a first and a second input acceleration control signals, wherein a ratio between said first and said second input acceleration control signals defines an input ratio; receiving a vehicle speed signal representative of said speed; and generating, from said first and said second input acceleration control signals, a first and a second output acceleration control signals, wherein a ratio between said first and said second output acceleration signals defines an output ratio that is substantially equal to said input ratio, said generating comprising, in a speed limiting mode, preventing said speed value from increasing beyond said speed limit value using said first and said second output acceleration control signal, said input and said output ratios remaining substantially equal; and controlling said speed using at least one of said first and said second output acceleration control signals.

Another aspect of the invention provides a method for preventing a value of a speed of a vehicle from exceeding a speed limit value, said method comprising: receiving a first and a second input acceleration control signal and a vehicle speed signal, wherein a ratio between said first and said second input acceleration control signal defines an input ratio; generating, from said first input acceleration control signal, a first output acceleration control signal, said first output acceleration control signal and said first input acceleration control signal having a similar characteristic when said speed value is lower than said speed limit value and said first output acceleration control signal being different to said first input acceleration control signal when said speed value reaches said speed limit value; producing a second output acceleration control signal having a ratio to said first output acceleration control signal defining an output ratio that is substantially the same as said input ratio; and controlling said speed using at least one of said first and said second output acceleration control signals.

Another aspect of the invention provides a speed limiting device to be installed on a vehicle for preventing a speed of said vehicle from exceeding a speed limit, said vehicle being adapted to provide at least a input acceleration control signal and a vehicle speed signal representative of said speed, said speed having a speed value, said device comprising:

a user interface for receiving at least a programming instruction and for providing at least a programming signal;

an input for receiving a input acceleration control signal and a vehicle speed signal;

a main unit, linked to said input and said user interface, capable of adopting at least a speed limiting mode and a programming mode, and for generating, from said input acceleration control signal, an output acceleration control signal, wherein, in said speed limiting mode, said output acceleration control signal and said input acceleration control signal have at least one similar characteristic when said speed value is lower than a value of said speed limit, and said output acceleration control signal is different from said input acceleration control signal, when said speed reaches said speed limit, whereby said speed is prevented from substantially exceeding said speed limit, said main unit comprising:

a memory for storing said speed value upon reception of said programming signal to provide a value of said speed limit;

whereby a user may, by driving said vehicle at a desired speed limit, provide said programming instruction to program said a value of speed limit as being a value of said desired speed limit; and an output, linked to said main unit, for substituting said output acceleration control signal for said input acceleration control, Another aspect of the invention provides a method for preventing a value of a speed of a vehicle from exceeding a speed limit value, said method comprising:

a speed limiting mode comprising:

receiving a input acceleration control signal and a vehicle speed signal representative of said speed of said vehicle and having a speed value; and generating, from said input acceleration control signal, a output acceleration control signal, said output acceleration control signal and said input acceleration control signal having a similar characteristic when said speed value is lower than said speed limit value and said output acceleration control signal being different to said input acceleration control signal when said speed value reaches said speed limit value; and a programming mode comprising:

receiving said vehicle speed signal;

receiving a programming instruction; and storing said speed value to provide said speed limit value.

Another aspect of the invention provides a method for programming a speed limit in a speed limiting device installed in a vehicle, said speed limiting device for preventing a speed of said vehicle from exceeding said speed limit, said method comprising:

receiving a vehicle speed signal representative of a speed of said vehicle and having a speed value;

receiving a programming instruction; and storing said speed value to provide a value of said speed limit.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE INVENTION

In one embodiment of the invention, the vehicle speed limiting device is a device that enables the owner or input user of a car or other vehicle to set a speed limit value and prevents the vehicle from exceeding this particular value in speed limiting mode. The input user is able to select between speed limiting and non speed limiting modes by the use of a remote unit. An output user is unable to activate, deactivate or program a speed limit. It thus allows a parent, the input user, to limit the speed at which their children, output users, can drive the car. The speed limiting device is designed to be installed on conventional fuel injected engine cars and can be installed alternatively on other vehicles such as trucks, buses or all-terrain vehicles.

The speed of a conventional car is controlled by a foot-operated acceleration pedal. The acceleration pedal is in electrical communication with the throttle valve through an engine control unit (ECU) or an electronic throttle controller (ETC), also sometimes referred to as the throttle control unit (TCU). In both cases, engine sensors provide airflow measurements to the onboard computer which controls fuel flow to obtain a desired air/fuel ratio. In the case of electrical connection, the acceleration pedal generates two acceleration pedal position (APP) signals, a low voltage and a high voltage APP signal. The two APP signals are received by the ECU or by the ETC to control the acceleration of the car. The "acceleration pedal" can be more generally called an "acceleration control device" and the "APP signals", "acceleration control signals".

In one embodiment of the invention, the speed limiting device receives the APP signals from the acceleration pedal. When in non speed limiting mode, the device simply forwards the APP signals to the ECU or the ETC. When in speed limiting mode, the device makes no change to the APP signals if the vehicle speed is below the speed limit value and alters the APP signals if the vehicle speed reaches the speed limit value, in order to limit the speed of the car. Altering the APP signals has the same effect as if the driver was reducing foot pressure to the accelerator pedal.

Figure 1:
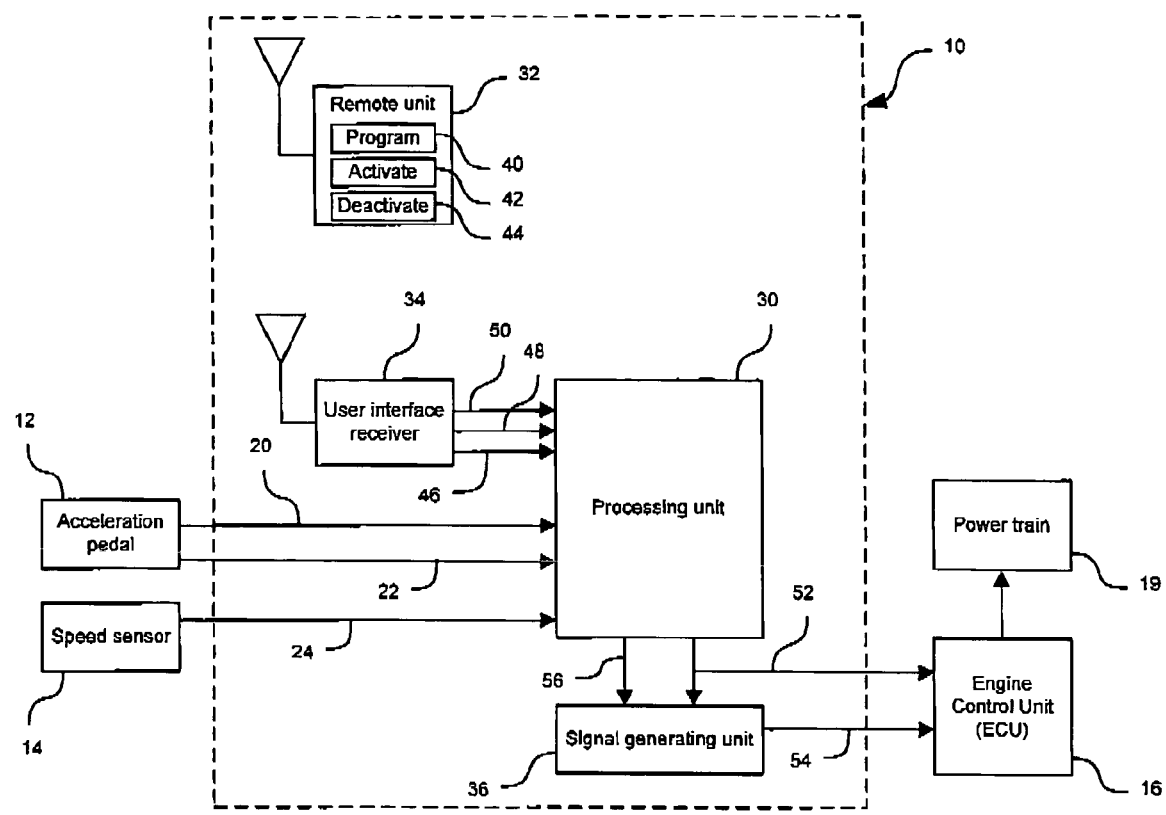
FIG. 1 is a block diagram of a speed limiting device included in a vehicle according to a first embodiment of the invention, wherein the speed of the vehicle is controlled using an engine control unit (ECU)

FIG. 1 illustrates a speed limiting device 10 installed in a car between the acceleration pedal 12 and the ECU 16. The speed limiting device 10 receives high voltage 20 and low voltage 22 input APP signals from an acceleration pedal 12, and a vehicle speed signal 24 from the vehicle speed sensor 14, and provides high voltage 52 and low voltage 54 altered APP signals to the ECU 16. The ECU controls the power train 19 which includes engine control parameters such as the throttle valve signal, the injector pulses and, possibly, gear selection. The speed limiting device 10 comprises a processing unit 30, a remote unit 32 to be carried by an input user, a user interface receiver 34 to receive the information from the remote unit 32 and a signal generating unit 36. The remote unit 32 comprises three push-buttons, a "program" button 40, an "activate" button 42 and a "deactivate" button 44.

In this embodiment, the remote unit 32 is wirelessly connected to the user interface receiver 34 using radio frequency, infrared or another wireless protocol. It can be carried as a key fob by the input user. This unit allows only the input user, having the remote unit 32 with her or him, to change the settings of the speed limiting device, i.e. to activate or deactivate speed limiting or to program a speed limit value. Output users, who do not have access to the remote unit 32, are unable to change the settings. The user interface receiver 34 receive instructions from the remote unit 32 and transmits programming 46, activating 48 and deactivating 50 signals to the processing unit 30.

The processing unit 30 receives the high voltage 20 and low voltage 22 input APP signals, the vehicle speed signal 24 and the programming 46, activating 48 and deactivating 50 signals, and provides a high voltage output APP signal 52. In response to an activating signal 48, the processing unit 30 activates the speed limiting mode. The speed limiting mode stays active until a deactivating signal 50 is received. In speed limiting mode, the high voltage output APP signal 52 is identical to the high voltage input APP signal 20 if the vehicle speed signal 24 indicates that the vehicle speed is below the speed limit value, and the high voltage output APP signal 52 is altered compared to the high voltage input APP signal 20 if the vehicle speed has reached the speed limit value, as will be described further below. The low voltage input APP signal 22 is used in cooperation with the high voltage input APP signal 20 during a calibration procedure, as will also be described further below. In this embodiment, the processing unit is a microcontroller with A/D converter and D/A converter such as Microchip PIC16C781 microcontroller.

The processing unit 30 comprises analog to digital converters (not shown) to convert the analog high voltage 20 and low voltage 22 input APP signals into digital signals to be processed. An altered digital signal is subsequently converted into the analog high voltage altered APP signal 52 using a digital to analog converter (not shown). The vehicle speed signal 24 received from the speed sensor 14 is an alternating signal. Depending on the model of the speed sensor 14 provided with the car, the vehicle speed signal 24 may be an analog alternating signal or a digital alternating signal. In both cases, the vehicle speed is determined from the frequency of the alternating signal. The vehicle speed signal 24 is amplified and conditioned such that an analog sine wave is converted to a digital square wave for frequency measurement. If the vehicle speed signal is digital, it passes through the same path but no change appears to it.

Figure 2:
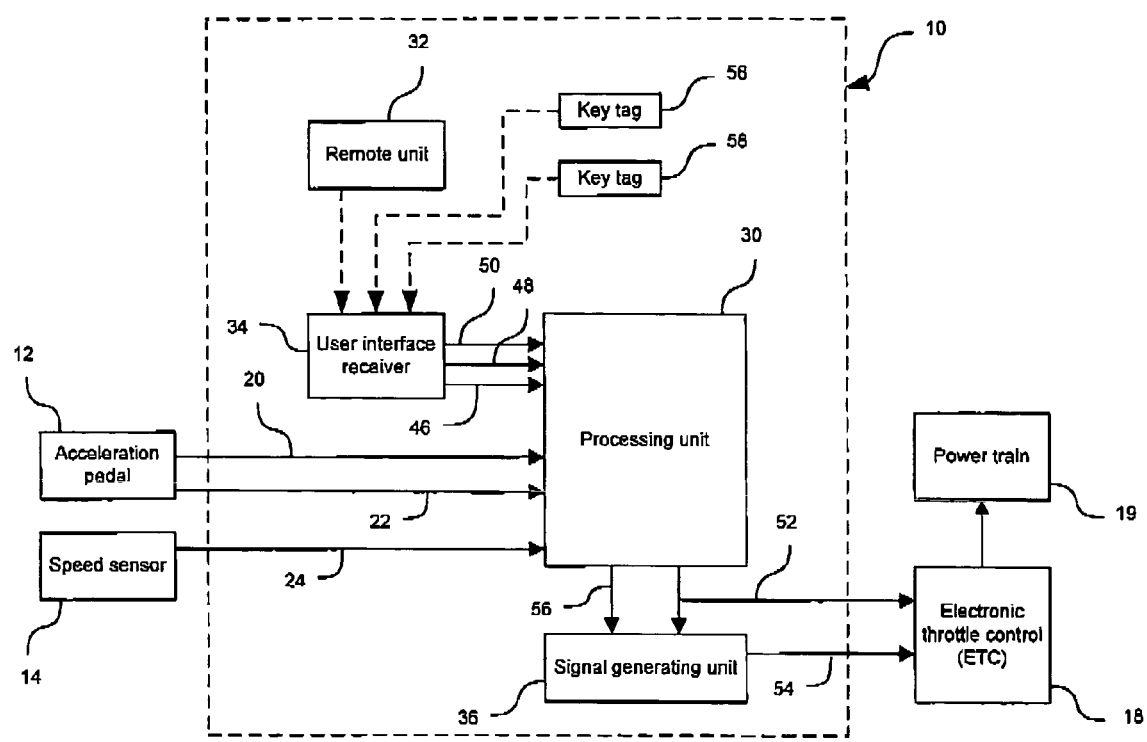
FIG. 2 is a block diagram of a speed limiting device included in a vehicle according to a second embodiment of the invention, wherein the speed of the vehicle is controlled using electronic throttle control (ETC)

The low voltage output APP signal 54 is generated using the signal generating unit 36 which receives the high voltage output APP signal 52. The signal generating unit 36 is a digital potentiometer that comprises a non-volatile memory, a MCP41XXX for instance. The acceleration pedal 12 generates two signals, the high voltage 20 and low voltage 22 input APP signals. The ECU requires both signals in order to work properly. If the ECU does not receive a high and a low voltage signal, it may generate an error or go into a limp mode. The high 20 to low 22 voltage input APP signals ratio is substantially constant during operation. It is thus once characterized automatically each time the car is started, and its value is stored in the signal generating unit 36. When properly calibrated, the signal generating unit 36 will ensure that the high 52 to low 54 voltage output signal ratio is equal to the high 20 to low 22 voltage input APP signal ratio. The signal generating unit 36 receives a calibration signal 56 from the processing unit 30 for calibration purposes, FIG. 2 shows a speed limiting device 10' installed in a car using an ETC instead of the ECU. The ETC directly controls the power train 19 which includes engine control parameters such as the throttle valve signal, the injector pulses and, possibly, gear selection. As the ECU, the ETC requires receiving both high voltage 52 and low voltage 54 altered APP signals to function properly and not to generate an error. Additionally, in this embodiment, key tags 58 may be used in order to differentiate between the different car users. For instance, the key tags 58 may use radio frequency identification technology. The use of key tags 58 would allow for a different maximum speed to be associated to each user. It would also provide for increased security against thieves by disconnecting the accelerator until there is a valid recognized key tag 58. Both devices 10 and 10' can be installed alternatively on cars using an ECU and cars using an ETC.

Figure 3:
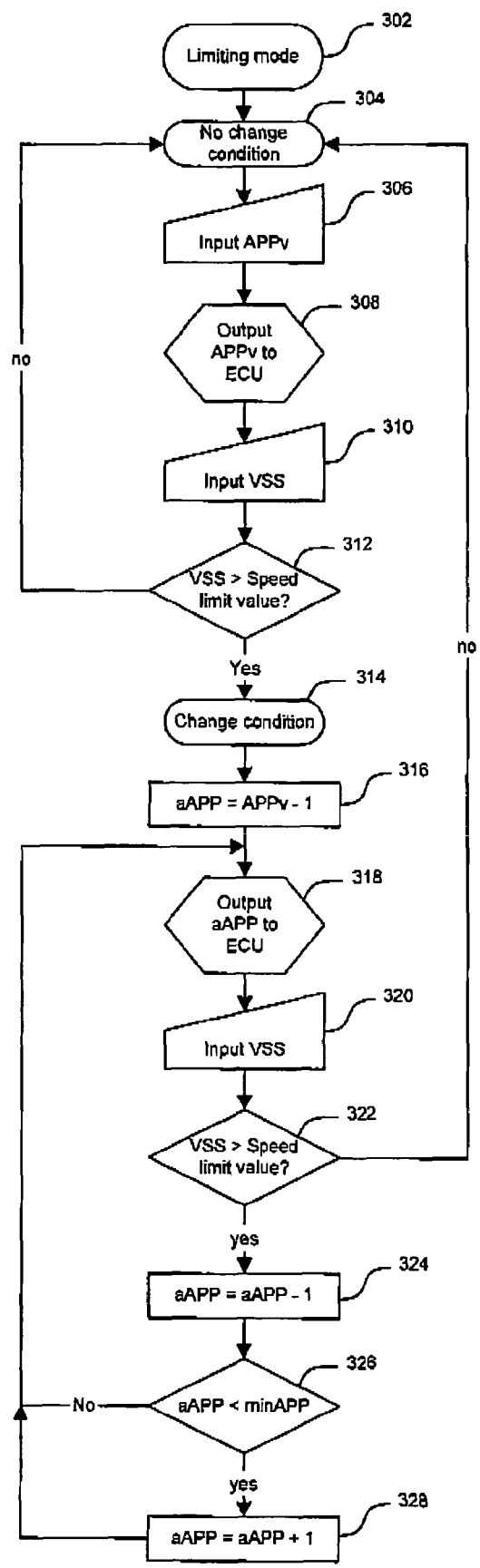
FIG. 3 is a flow chart describing a speed limiting mode of a speed limiting device processing unit according to one embodiment of the invention.

FIG. 3 describes the speed limiting mode 302 behavior of the processing unit. In the following description, it is considered that the speed of the vehicle is controlled using an ECU but it could also be controlled using and ETC. While in speed limiting mode, the processing unit monitors the speed of the vehicle using the frequency of the vehicle speed signal while forwarding the high voltage APP signal without alteration. When the speed reaches the speed limit value, the high voltage APP signal is altered to reduce the acceleration of the vehicle so that the speed does not exceed the speed limit value. The processing unit incoming signals are digitized, as described above, so that the speed limiting mode 302 receives a digital input APP value (APPv) and a digital speed value (VSS). The resulting altered APP value (aAPP) is converted into analog high voltage altered APP signal.

Figure 4:
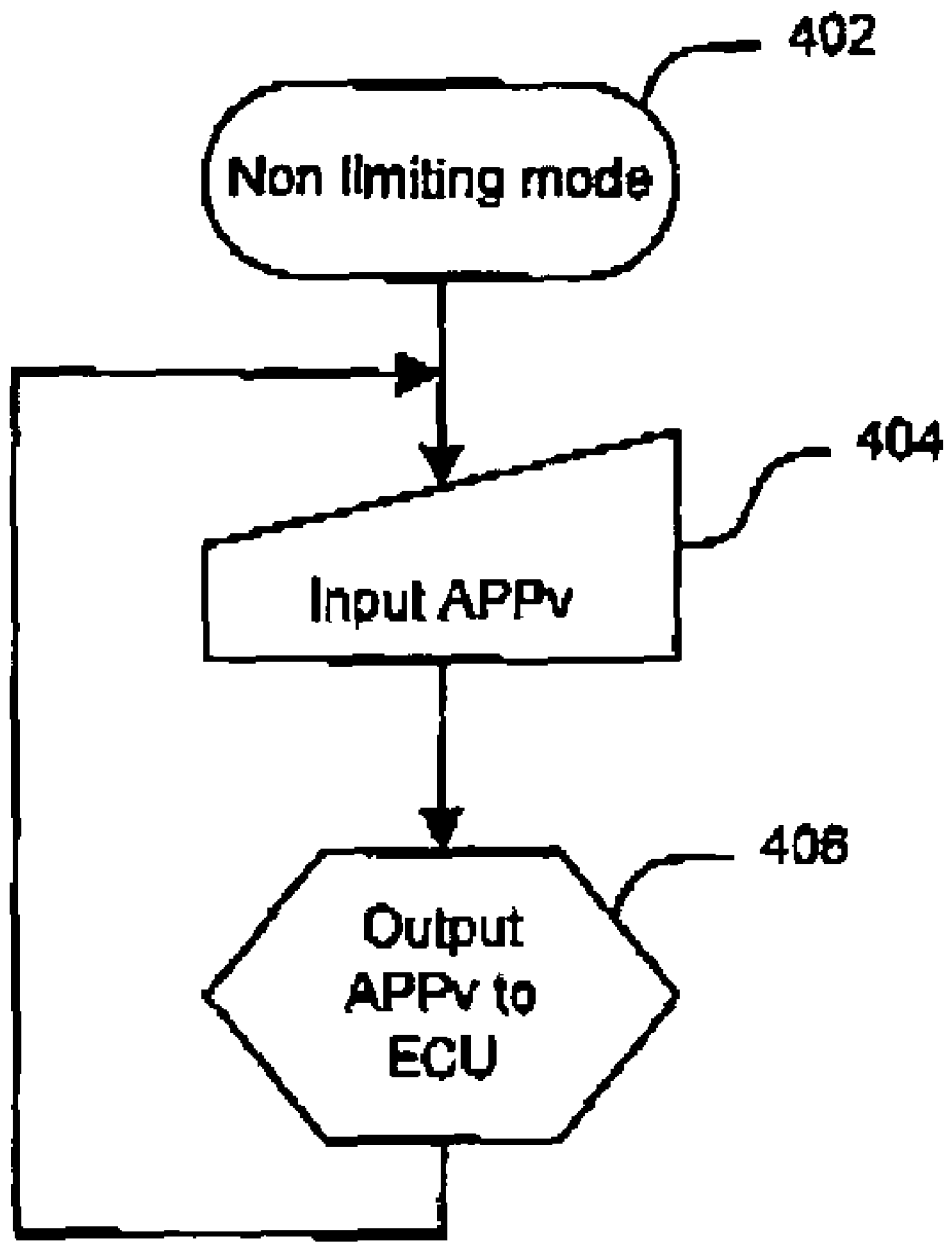
FIG. 4 is a flow chart describing a non speed limiting mode of a speed limiting device processing unit according to one embodiment of the invention.

The speed limiting mode 302 starts in a no change condition 304 in which the input APP value (APPv) is inputted in step 306 and forwarded to the ECU in step 306 with no change in value. In step 310, the speed value (VSS) is inputted and compared to the speed limit value in step 312. If the speed value (VSS) exceeds the speed limit value, the change condition 314 starts. Otherwise, the no change condition 304 restarts. When the change condition 314 starts, in step 316, the altered APP value (APP) is made equal to the input APP value (APPv) and reduced by one digit. The resulting altered APP value (aAPP) is outputted to the ECU in step 318. Then, in step 320, the speed value (VSS) is inputted and compared to the speed limit value in step 322. If the speed value (VSS) does not exceed the speed limit value, the no change condition 304 restarts. Otherwise, the altered APP value (aAPP) is reduced again by one digit in step 324. In step 326, the altered APP value (aAPP) is compared to a minimal APP value default setting (minAPP). If the altered APP value (aAPP) is lower than the minimal APP value (minAPP), the altered APP value (aAPP) is increased of one digit is step 328 and the system then goes back to step 318. Otherwise, it goes back to step 318 directly FIG. 4 illustrates the non speed limiting mode 402 of the processing unit. While in non speed limiting mode, the processing unit simply forwards the input APP value (APPv) to the ECU with no change in value. The non speed limiting mode 402 starts with step 404 in which the input APP value (APPv) is inputted. In step 406, it is forwarded to the ECU. The system then goes back to step 404.

Figure 5:
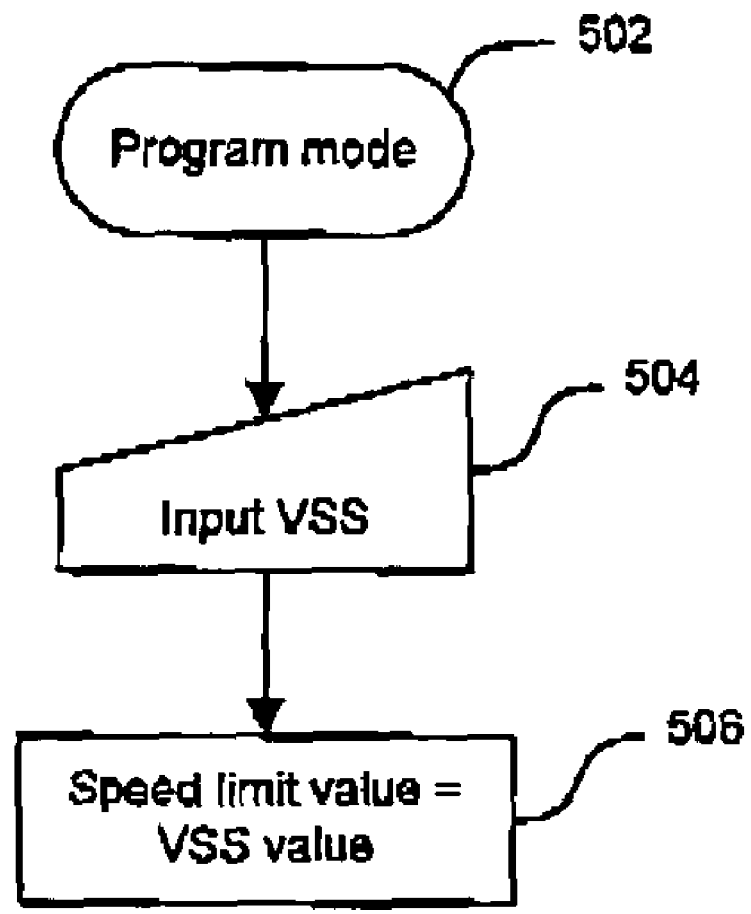
FIG. 5 is a flow chart describing a program mode of a speed limiting device processing unit according to one embodiment of the invention.

FIG. 5 describes the program mode 502 of the processing unit. This mode allows the input user of the car to set the speed limit value equal to the speed at which he or she is currently driving the car. The program mode 502 starts with step 504 in which the speed value (VSS) is inputted. In step 506, the speed limit value in set to be equal to the speed value (VSS). The program mode then ends. As will be explained further below, the processing unit then goes back to the mode that was active before an interrupt caused it to go in the program mode.

Switches between the limiting, the non limiting and the program modes are caused by interrupts. As the input user presses the "activate" button on the remote unit, the user interface receives the instruction and sends an activating signal to the processing unit. This event generates an interrupt and the system goes into speed limiting mode. The same process occurs for the other two buttons.

Figure 6:
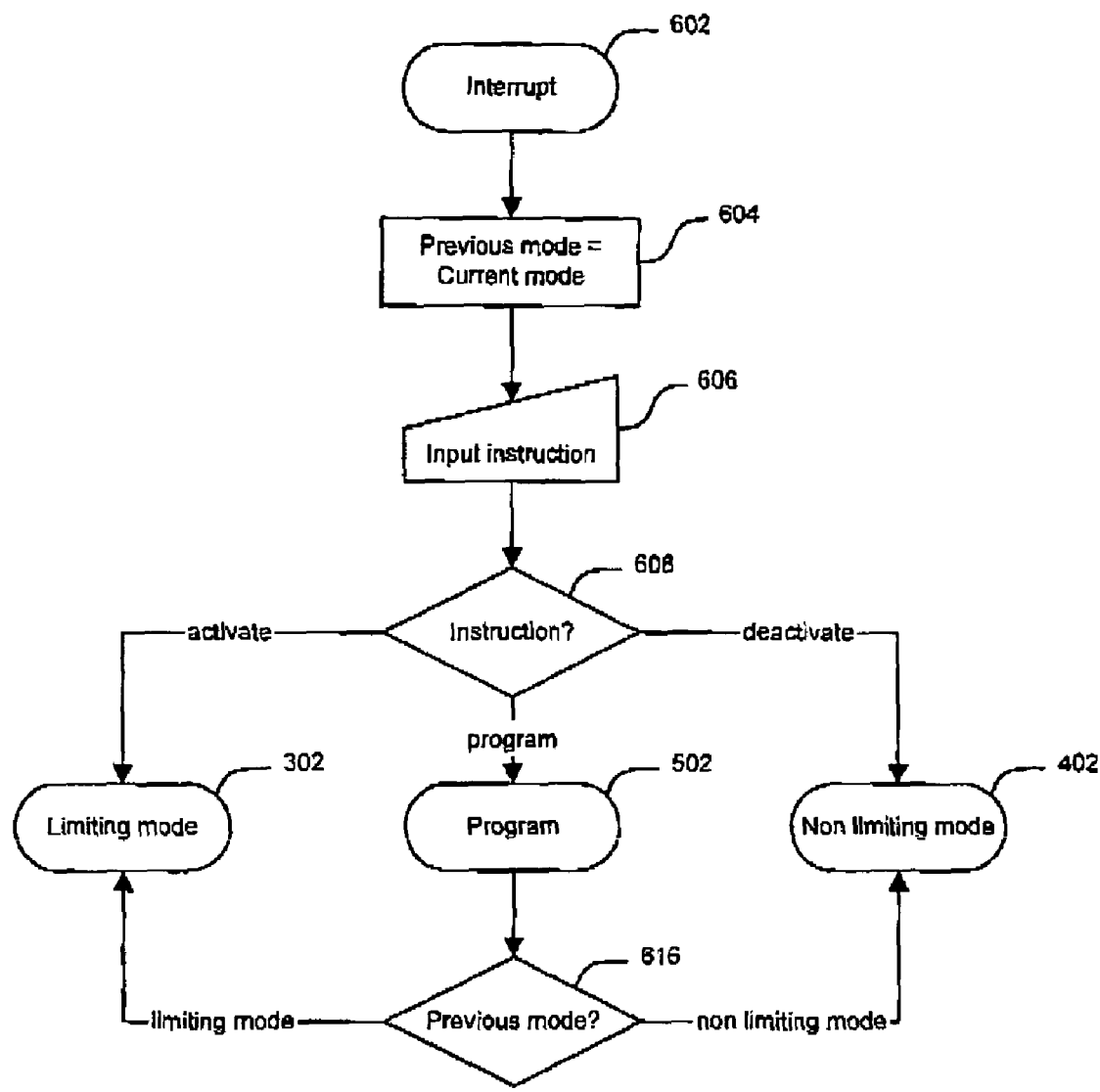
FIG. 6 is a flow chart describing an interrupt of a speed limiting device processing unit according to one embodiment of the invention.

FIG. 6 shows the interrupt 602 process in response to the use of the remote unit. When an interrupt 602 arises, the current mode is saved in step 604. In step 606, the instruction value is inputted. In step 608, if the instruction is an activating instruction, the system goes into the speed limiting mode 302, if the instruction is a deactivating instruction, the system goes into the non speed limiting mode 402 and if the instruction is a programming instruction, the system goes into the program mode 502. The speed limiting 302 and the non speed limiting 402 modes are continuous and will continue until another interrupt 602 arises. The program mode 502 is different. When it ends, the system goes to step 616, where it checks what the previous mode was (saved in step 604). It then goes into this previous mode, i.e. the speed limiting mode 302 or the non speed limiting mode 402.

Figure 7:
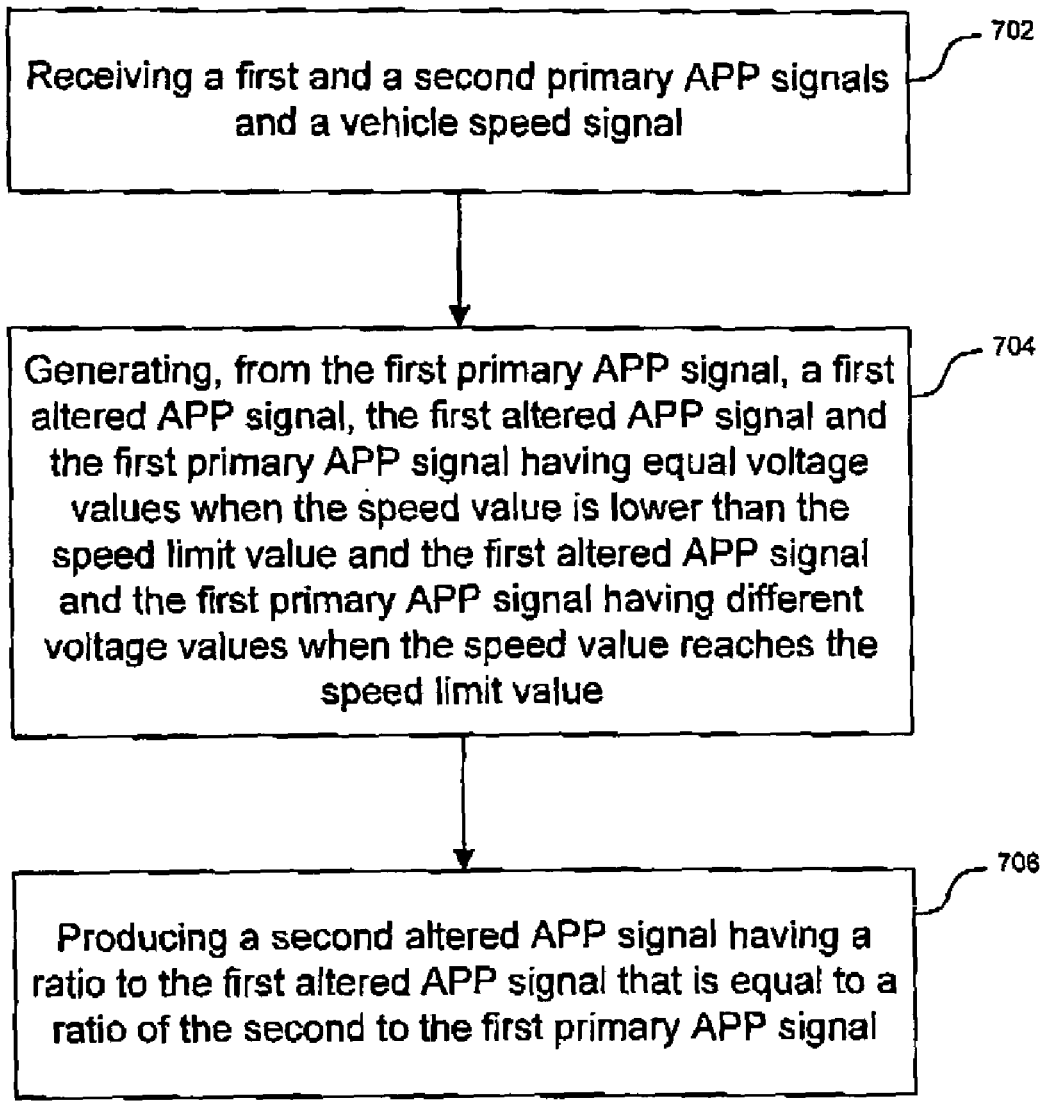
FIG. 7 is flow chart describing a method for preventing a speed of a vehicle to exceed a speed limit value by altering acceleration pedal position signals.

FIG. 7 illustrates a method for preventing the speed of a vehicle to exceed a speed limit value by altering APP signals received by the engine control unit. In step 702, a first and a second input APP signal and a vehicle speed signal are received. In step 704, a first altered APP signal is generated from the first input APP signal. The first altered APP signal and the first input APP signal have equal voltage values when the speed value is lower than the speed limit value and the first altered APP signal and the first input APP signal have different voltage values when the speed value reaches the speed limit value. In step 706, a second altered APP signal is produced. The second altered APP signal has a ratio to the first altered APP signal that is equal to a ratio of the second to the first input APP signal.

Figure 8:
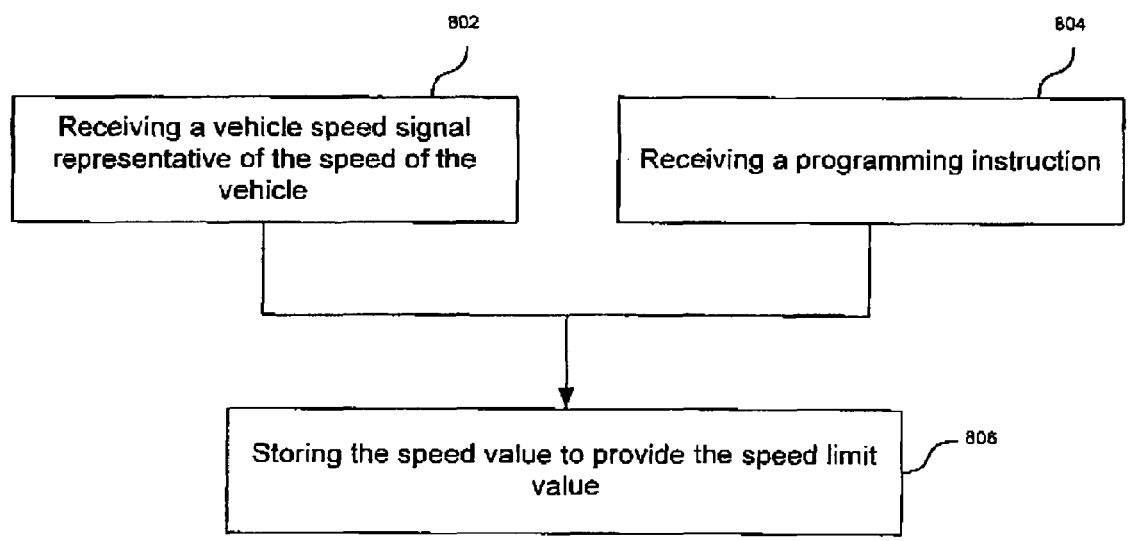
FIG. 8 is flow chart describing a method for programming a speed limit value in a speed limiting device installed in a vehicle.

FIG. 8 shows a method for programming the speed limit value in a speed limiting device installed in a vehicle. In step 802, a vehicle speed signal representative of the current speed of the vehicle is received. In step 804, a programming instruction is receiving. In step 806, the speed value is consequently stored to provide the speed limit value.

Some alternatives to the above-presented embodiment will now be discussed.

One skilled in the art will understand that, alternatively, the remote unit can be directly linked to the processing unit using electrical connections. In this case, the remote unit could be removable and thus still be carried on by an input user, or it could be fixed and be protected by the use of a password, in order that only the input user could change the settings of the speed limiting device.

In one embodiment described herein, the speed limit value is programmed by driving the vehicle at a desired speed limit and by providing a programming instruction using the push-button. Alternatively, the speed limit value could be entered using a user interface having a keyboard. The user interface could then be removable so that it is to be carried on by the input user, and thus acting as a key or the user interface may be protected by password. Furthermore, the activating, deactivating and programming instructions could be provided using voice recognition or other means. The speed limiting device settings could then be protected by the use of a password, a key, a key card or speaker recognition.

In one embodiment of the invention, the acceleration control device is an acceleration pedal as installed in most vehicles. Alternatively, the acceleration control device could be an acceleration lever or buttons as those installed for handicapped drivers.

One skilled in the art will understand that the low voltage APP signal could be generated by the processing unit and the high voltage APP signal be generated by the signal generating unit, using the low voltage APP signal. A combination of the processing unit and the signal generating unit is a main unit. Alternatively, the relationship between high and low voltage APP signals could be saved in the system using a look up table instead of a fixed ratio. This would allow characterizing and storing a variable ratio. In another alternative, both the high and the low voltage altered APP signals could be generated directly from the high and the low voltage input APP signals. This could be done by forwarding the APP signals in non speed limiting mode and when the speed of the vehicle is below the speed limit value, and by reducing each APP signals with a different value when the speed has reached the speed limit value, a ratio between reduction values being equal to a ratio between signal voltage values. In this case, the main unit is the processing unit.

Moreover, the acceleration control signals, e.g. the APP signals, described herein are analog voltage signals generated by the acceleration pedal and received by the ECU or the ETC. APP signals could alternatively be analog current signals, digital signals or any signals generated by an acceleration control device and to be received by a throttle control device. The speed limiting device could then be adapted to receive and to generate these alternative signals.

Furthermore, the acceleration control signals, e.g. the APP signals, could be directed to any device effective on the acceleration of the vehicle. As an example, instead of being directed to the ECU or the ETC, the acceleration control signals could be directed to a digital throttle controller or to an injection controller if the vehicle on which the speed limiting device is to be installed uses one of these devices to control its acceleration.

The embodiments of the invention described above are intended to be exemplary only. The scope of the invention is therefore intended to be limited solely by the scope of the appended claims.

What is claimed is:

1. A speed limiting device for installation in a vehicle and for preventing a value of a speed of said vehicle from exceeding a speed limit value, said device comprising:

an input for receiving a first and a second input acceleration control signals and a vehicle speed signal representative of said speed value, wherein a ratio between the first and second input acceleration control signals defines an input ratio; and a main unit, linked to said input, for generating, from said first and said second input acceleration control signals, a first and a second output acceleration control signals, at least one of said first and said second output acceleration control signals for controlling said speed, wherein a ratio between said first and said second output acceleration signals defines an output ratio that is substantially equal to said input ratio, said main unit being capable of adopting a speed limiting mode wherein said first and said second output acceleration control signals are such that said speed value is prevented from increasing beyond said speed limit value while said input and said output ratios remain substantially equal.

2. The speed limiting device as claimed in claim 1, further comprising a user interface for receiving a programming instruction and for providing a programming signal to be transmitted to said main unit, said main unit being capable of adopting a programming mode for programming said speed limit value as being equal to said speed value, whereby a user associated with said user interface may, by driving said vehicle at said speed, provide said programming instruction to program said speed limit value.

3. The speed limiting device as claimed in claim 2, wherein said main unit comprises a memory for storing said speed value upon reception of said programming signal to provide said speed limit value.

4. The speed limiting device as claimed in claim 1, wherein, in said speed limiting mode, said first output acceleration control signal and said first input acceleration control signal are functionally similar when said speed value is lower said speed limit value, and, when said speed value reaches said speed limit value, said first output acceleration control signal is different from said first input acceleration control signal.

5. The speed limiting device as claimed in claim 1, further comprising an output, linked to said main unit, for substituting said first and said second output acceleration control signals for said first and said second input acceleration control signals.

6. The speed limiting device as claimed in claim 2, wherein said user interface comprises a remote unit.

7. The speed limiting device as claimed in claim 6, wherein said remote unit comprises a key fob.

8. The speed limiting device as claimed in claim 1, wherein said main unit is further capable of adopting a non speed limiting mode, wherein, in said non speed limiting mode, said first output acceleration control signal and said first input acceleration control signal are functionally similar.

9. The speed limiting device as claimed in claim 8, further comprising a user interface for receiving activating and deactivating instructions and for providing activating and deactivating signals to be forwarded to said main unit, wherein said activating signal is to activate said speed limiting mode and said deactivating signal is to activate said non speed limiting mode.

10. The speed limiting device as claimed in claim 1, wherein said at least one of said first and said second output acceleration control signals controls said speed by controlling at least one of a throttle valve signal, injector pulses and gear selection.

11. The speed limiting device as claimed in claim 1, wherein said first output acceleration control signal comprises a high voltage signal and said second output acceleration control signal comprises a low voltage signal.

12. The speed limiting device as claimed in claim 1, further comprising at least one key tag associated with an output user and for differentiating said output user from other users.

13. The speed limiting device as claimed in claim 1, wherein said main unit comprises a signal generating unit for storing said input ratio, wherein said second output acceleration control signal is generated from said first output acceleration control signal using said input ratio.

14. The speed limiting device as claimed in claim 13, wherein said signal generating unit comprises a digital potentiometer.

15. A method for preventing a value of a speed of a vehicle from exceeding a speed limit value, said method comprising:

receiving a first and a second input acceleration control signals, wherein a ratio between said first and said second input acceleration control signals defines an input ratio;

receiving a vehicle speed signal representative of said speed; and generating, from said first and said second input acceleration control signals, a first and a second output acceleration control signals, wherein a ratio between said first and said second output acceleration signals defines an output ratio that is substantially equal to said input ratio, said generating comprising, in a speed limiting mode, preventing said speed value from increasing beyond said speed limit value using said first and said second output acceleration control signal, said input and said output ratios remaining substantially equal; and controlling said speed using at least one of said first and said second output acceleration control signals.

16. The method as claimed in claim 15, further comprising driving said vehicle at a desired speed limit, providing a programming instruction and programming a value of said speed limit as being equal to a value of said desired speed limit, whereby a user may, by driving said vehicle at said desired speed limit, provide said programming instruction to program said speed limit value.

17. The method as claimed in claim 16, further comprising storing said speed value upon reception of said programming instruction and providing said speed limit value.

18. The method as claimed in claim 15, wherein, in said speed limiting mode, said first output acceleration control signal and said first input acceleration control signal have at least one similar characteristic when said speed value is lower said speed limit value, and, when said speed value reaches said speed limit value, said first output acceleration control signal is different from said first input acceleration control signal.

19. The method as claimed in claim 15, further comprising substituting said first and said second output acceleration control signals for said first and said second input acceleration control signals.

20. The method as claimed in claim 15, wherein said generating further comprises a no change condition and a change condition, said no change condition comprising:

inputting a first input digital signal representative of said first input acceleration control signal, outputting said first input digital signal to said engine control unit, inputting said speed value, comparing said speed value to said speed limit value, and going to said change condition if said speed value (VSS) exceeds said speed limit value and otherwise restarting said no change condition;

and said change condition comprising:

making a first output digital signal equal to said first input digital signal reduced by one digit, outputting said first output digital signal to said engine control unit, inputting said speed value, comparing said speed value to said speed limit value, restarting said no change condition if said speed value does not exceed said speed limit value reducing said first output digital signal of one digit comparing said first output digital signal to a minimal signal value, increasing said first output digital signal of one digit if said first output digital signal is lower than said minimal signal value, and going back to said outputting said first output digital signal.

21. A method for preventing a value of a speed of a vehicle from exceeding a speed limit value, said method comprising:

receiving a first and a second input acceleration control signal and a vehicle speed signal, wherein a ratio between said first and said second input acceleration control signal defines an input ratio;

generating, from said first input acceleration control signal, a first output acceleration control signal, said first output acceleration control signal and said first input acceleration control signal having a similar characteristic when said speed value is lower than said speed limit value and said first output acceleration control signal being different to said first input acceleration control signal when said speed value reaches said speed limit value;

producing a second output acceleration control signal having a ratio to said first output acceleration control signal defining an output ratio that is substantially the same as said input ratio; and controlling said speed using at least one of said first and said second output acceleration control signals.

22. The method as claimed in claim 21, further comprising driving said vehicle at a desired speed limit, providing a programming instruction and programming a value of said speed limit as being equal to a value of said desired speed limit, whereby a user may, by driving said vehicle at said desired speed limit, provide said programming instruction to program said speed limit value.

23. The method as claimed in claim 22, further comprising storing said speed value upon reception of said programming instruction and providing said speed limit value.

* * * * *